United States Patent [19]

Wallouch

[11] 4,100,314

[45] Jul. 11, 1978

[54] METHOD FOR INCREASING THE STRENGTH AND DENSITY OF CARBONACEOUS PRODUCTS

[75] Inventor: Rudolph W. Wallouch, Lewiston, N.Y.

[73] Assignee: Airco, Inc., Montvale, N.J.

[21] Appl. No.: 782,598

[22] Filed: Mar. 29, 1977

[51] Int. Cl.$^2$ ............................................. B05D 3/02
[52] U.S. Cl. ................................. 427/228; 264/29.5; 423/445; 423/449; 427/402; 427/407 R
[58] Field of Search ........... 427/228, 122, 402, 407 R; 264/29; 423/445, 449

[56] References Cited

U.S. PATENT DOCUMENTS

| | | | |
|---|---|---|---|
| 2,174,887 | 10/1939 | Kiefer .................................. | 427/228 |
| 3,126,296 | 3/1964 | Moutaud ............................. | 427/228 |
| 3,167,447 | 1/1965 | Tully et al. .......................... | 427/228 |
| 3,238,054 | 3/1966 | Bickerdike et al. ................. | 427/228 |
| 3,558,344 | 1/1971 | Peterson et al. .................... | 427/228 |
| 3,628,984 | 12/1971 | Ishikawa et al. .................... | 427/228 |
| 3,632,385 | 1/1972 | Schmitt et al. ...................... | 427/228 |
| 3,922,334 | 11/1975 | Marck et al. ........................ | 427/228 |
| 3,936,535 | 2/1976 | Bóder .................................. | 427/228 |
| 3,998,689 | 12/1976 | Kitago et al. ........................ | 427/228 |
| 4,024,226 | 5/1977 | Lersmacher et al. ............... | 427/228 |

*Primary Examiner*—Ronald H. Smith
*Assistant Examiner*—Janyce A. Bell
*Attorney, Agent, or Firm*—Edmund W. Bopp; Larrry R. Cassett

[57] ABSTRACT

A method for increasing density and strength in baked carbonaceous products such as carbon or graphiteelectrodes. A baked carbonaceous body is subjected to a conventional pitch impregnation, and is then coated with a thermosetting polymerizable composition, which composition is at least partially cured to provide an encasing shell of polymeric material. The shell-encased body containing impregnated pitch is thereafter subjected to carbonization by rebaking. During rebake, the shell is mechanically stable to temperatures above the softening and free flowing temperatures for the impregnant, whereby the shell (which is decomposed and carbonized as higher temperatures are attained) acts during initial stages of carbonization to retain the impregnant within the body. This results in larger quantities of coked impregnant remaining in the body with consequent higher apparent density and strength in the resultant product. The product can then, as desired, by subjected to a conventional heating schedule to effect graphitization.

10 Claims, 8 Drawing Figures

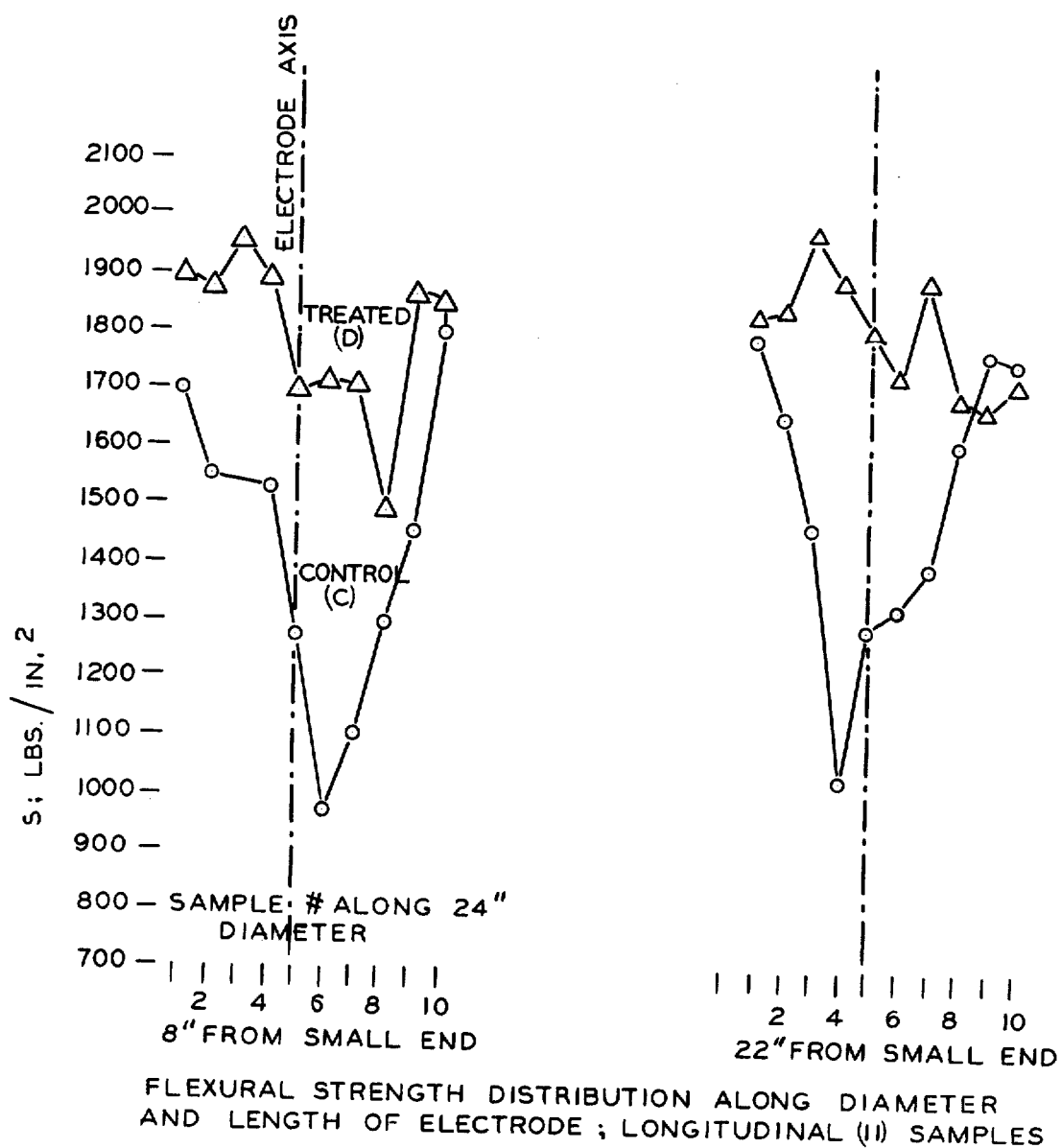
FLEXURAL STRENGTH DISTRIBUTION ALONG DIAMETER AND LENGTH OF ELECTRODE; LONGITUDINAL (II) SAMPLES FLEXURAL STRENGTH DISTRIBUTION ALONG DIAMETER AND LENGTH OF ELECTRODE. LONGITUDINAL (ll) SAMPLES BULK DENSITY DISTRIBUTION ALONG DIAMETER AND LENGTH OF ELECTRODE: LONGITUDINAL (II) SAMPLES

METHOD FOR INCREASING THE STRENGTH AND DENSITY OF CARBONACEOUS PRODUCTS

BACKGROUND OF INVENTION

This invention relates generally to the manufacture of carbonaceous materials such as carbon and graphite, and more specifically relates to a process for substantially reducing the porosity and thereby increasing the density and strength of bodies comprising such carbonaceous materials.

The manufacture of artificial graphite, including, for example, the manufacture of graphitic electrodes for use in the chemical and metallurgical industries, is based upon the use of porous petroleum coke as raw material. Since coke porosity has a direct bearing upon the properties of the graphitic end product, it is of economic significance to reduce the porosity of the carbonaceous artifacts after initial baking thereof by impregnating same with a tarry hydrocarbon. Thus the impregnation of carbonaceous bodies, such as the aforementioned electrodes, with such tarry hydrocarbons as coal tar, coal tar pitch, or petroleum pitch, is a well-known process, and is presently being used extensively in the carbon and graphite industry for the purpose of reducing the porosity and permeability of carbon and graphite.

Considering by way of example the large baked electrodes which are customarily utilized in arc furnaces and similar metallurgical environments, the conventional pitch impregnation procedure involves two principal processing steps: i.e. a vacuum-pressure impregnation of the baked electrode with pitch, and a subsequent sagger rebaking of the pitch-impregnated electrode. Thus in a typical procedure baked electrodes to be impregnated are initially placed in a suitable open-mesh carrier within a preheating oven and heated above the melting point of the pitch impregnant. The carrier and preheated material is then transferred into an autoclave which is preheated to temperatures substantially above the melting point of the impregnating pitch. The chamber is sealed and evacuated to remove air from the accessible pores. While maintaining the vacuum, pitch is drawn in until it completely covers the materials to be impregnated. An over-pressure is then applied to drive the impregnant into the pores of the electrode stock. The electrodes are subsequently removed from the autoclave and allowed to cool, and subsequently the pitch impregnated electrodes are heat treated (i.e. rebaked) to a temperature (650° C to 850° C) which will carbonize the pitch impregnant in the pores of the electrodes. After cooling the impregnated and rebaked electrodes are ready for graphitization, as desired.

It is well known that the coke yield obtained from rebaking of pitch-impregnated electrodes, is consistently below the actual coking value of the impregnant pitch by approximately 30%. This low percentage coke yield is considered an inherent shortcoming of the process, and is caused by exudation of the pitch from the impregnated electrode during the heat treating which precedes carbonization of the impregnant.

At least one proposal has been forthcoming, directed at increasing pitch retention during rebake of the electrodes, to thereby result in increased density in the rebaked material. Thus, in U.S. Pat. No. 2,911,319 shaped and baked carbonaceous products are impregnated and baked until coking of the impregnating agent is effected, by keeping the shaped bodies immersed in pitch during the coking procedure.

By and large, however, the prior art techniques, including that discussed above, have been found relatively unsatisfactory.

In accordance with the foregoing, it may be regarded as an object of the present invention, to provide a method for increasing density and strength in baked carbonaceous bodies such as baked carbon and graphite electrodes or the like.

It is a further object of the present invention, to provide a method which minimizes the losses normally suffered by impregnated carbonaceous bodies, where such bodies following impregnation with pitch compositions are subjected to a rebaking schedule with consequent loss of portions of the impregnant due to exudation of such material from the body during early portions of the rebaking cycle.

It is a still further object of the invention to provide a method which enables the pitch or similar tarry hydrocarbon compositions impregnated into a carbonaceous body to be more effectively retained within the body during the rebaking which effects impregnant carbonization; which method thereby provides increased density and strength in the said bodies; and which method, further, promotes greater uniformity of density and strength throughout the treated body than would be achieved absent use of the invention.

SUMMARY OF INVENTION

Now in accordance with the present invention, the foregoing objects, and others as will become apparent in the course of the ensuing specification, are achieved by coating a carbonaceous body which has previously been impregnated with a tarry hydrocarbon composition, with a thermosetting polymerizable composition, and at least partially curing the coating composition to provide an encasing shell of polymeric material about the body. The shell-encased body is thereupon subjected to rebaking, which during the initial heating of the body further polymerizes the coating composition. The coating composition is characterized as being mechanically stable during the rebake to temperatures above the softening and free flowing temperatures for the impregnating composition. Thus in a typical instance the impregnating composition softens at about 100° C and becomes free flowing at about 200° C (and thereupon begins to decompose and carbonize), while the coating composition remains mechanically stable to at least 300° C, above which it begins to undergo decomposition and carbonization in the solid state, with the resultant breakdown of the coating at these higher temperatures enabling completion of impregnant carbonization. The net result of the foregoing sequence is that the said encasing shell acts during initial stages of rebake to retain the impregnating composition within the interstitial volumes and pores of the said body, to thereby increase the resultant density and strength in the body following rebake.

The achieved impregnant retention, further serves to increase uniformity of density and strength throughout the said body, and especially along radii thereof.

Following the rebake and resultant carbonization, the carbonaceous body which may, for example, by an electrode or the like, can be subjected to a customary extended heat treatment, to effect graphitization.

A preferred coating composition for use with the invention comprises pitch (e.g. a petroleum pitch), a resinifiable furan solvent (e.g. furfural), and a catalytic curing agent. The pitch to furan ratio is generally in the range of from about 1:2 to 3:1, with a preferred ratio being from about 3:2. The curing agent, i.e. an acid catalyst, is preferably added to the pitch-furan system in quantities of about 5 to 10% by weight of such system.

The coating composition may also comprise a solid resin as, for example, an epoxy or phenolic resin, dissolved in a furan plasticizer (e.g. furfural and/or furfuryl alcohol) together with a suitable catalytic curing agent.

BRIEF DESCRIPTION OF DRAWINGS

The invention is diagrammatically illustrated, by way of example, in the drawings appended hereto, in which:

FIGS. 1 through 4 are graphs depicting flexural strengths along the diameters and lengths of reference electrodes, and of electrodes treated in accordance with the present invention.

DESCRIPTION OF PREFERRED EMBODIMENT

Figure 3:
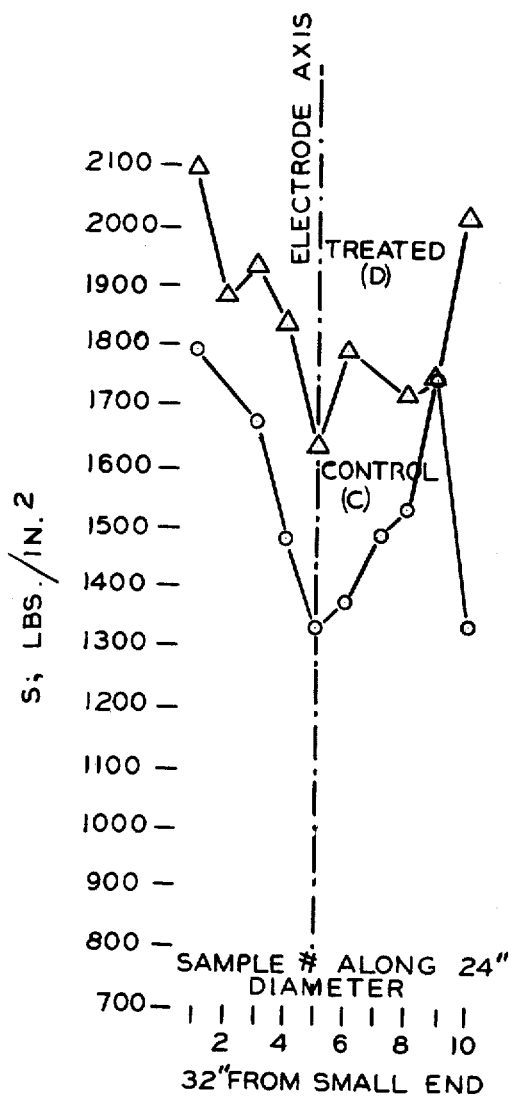

Initially it may be observed that while the present invention is applicable to carbonaceous bodies generally, the method of the invention finds particular application in the treatment of baked carbonaceous bodies, and most especially in the treatment of the baked carbon or graphite electrodes commonly employed in the metallurgical and chemical processing industries. The invention will therefore be especially described in connection with its application to treatment of such electrodes, but it will be understood that the invention is not to be deemed thus limited.

EXAMPLE I

In this Example a baked 14 dia. × 60 inch carbon electrode was debarked and saw-cut into 14 dia. × 17 inch logs. Two such logs, specimens A and B, were pitch-impregnated in production equipment, utilizing the impregnation techniques previously discussed, with the impregnating composition comprising a coal tar pitch having a softening point at about 100° C. The said composition becomes free flowing at about 200° C, and above this temperature begins to decompose and carbonize.

Pursuant to the present invention, specimen B was immersed following pitch impregnation in a solution of 1.75 parts by weight Ashland 240 petroleum pitch in one part by weight furfural, together with 5% by weight of pitch and furfural, of diethylsulfate, as a curing agent. Following immersion, specimen B was cured for 24 hours at room temperature, whereby the solution formed a hard coating on the surface of the stock. Both specimens were rebaked on a 5½ day schedule in a car bottom kiln. The hard coating of specimen B significantly reduced pitch rundown during rebaking. Table I hereinbelow summarizes the processing data for the two 14 dia. × 17 inch logs. It will be observed that the coking value of the treated specimen B was increased over the control log A by about 6%.

TABLE I

| | Processing Conditions of Resin Coating and Rebake of (14" dia. × 17") Logs (Electrodes) | | | | | |
|---|---|---|---|---|---|---|
| Electrode | Coating [a] Pitch-Furfural Ratio (P/F) | Weight of Log (lbs.) | | | Pitch Pickup (%) | Coking Value Impregnant (%) CV |
| | | Debarked | Impregnated | Rebaked [b] | | |
| A(Control) | None | 180 | 197.5 | 185.8 | 9.7 | 33.1 |
| B(Coated) | (1.75:1); 5%DES | 180 | 198.0 | 187.0 | 10.0 | 38.9 |

[a] Legend: DES - Diethylsulfate Liquid Curing Agent P - Petroleum Pitch Ashland 240 F - Furfural
[b] Rebake Schedule: 6C/hr. to 600C; 12C/hr. to 900C After rebake both the control and treated stock were graphitized in a production graphitizer, and subsequently measured for physical properties. The differences between the average measured properties for the treated electrode relative to the control electrode are listed in Table II hereinbelow. It will be seen that the coated specimen A displayed higher density, strength and modulus of elasticity, and lower resistivity than did the uncoated control specimen A. A modest increase in the coefficient of thermal expansion (CTE) is also displayed by the treated samples — which is to be expected in view of the change in density and strength.

TABLE II

| | Difference in Average Properties of the Coated Electrode (B) Relative to the Control Electrode (A) | | | | |
|---|---|---|---|---|---|
| Sample Direction | Apparent Density (gm/cc) | Specific Resistance (ohm-in. × $10^{-5}$) | Flexural Strength (psi) | Elastic Modulus (psi × $10^6$) | CTE ($C^{-1} \times 10^{-6}$) |
| Longitudinal* | + 0.03 | − 0.9 | + 294 | + 0.056 | + 0.12 |
| Transverse* | + 0.02 | − 0.6 | + 406 | + 0.162 | ± 0.00 |

*The electrodes comprise extruded polycrystalline graphite — with the crystallite alignment being in the direction of extrusion. Longitudinal samples are those which are shaped so that their long axis (and thus the axis for flexure testing) is parallel to the extrusion direction; the transverse samples are cut so that their long axis is transverse (actually perpendicular) to the extrusion direction.

EXAMPLE II

Two electrodes having dimensions of 24 dia. × 72 inch length were debarked and pitch-impregnated in a full scale commercial vacuum-pressure impregnation apparatus by the previously discussed prior art procedures, and were thereafter weighed. The percent pitch pickup by the electrodes was determined from the electrode weight before and after impregnation. One of the two pitch impregnated electrodes was treated by brushing on the electrode surface a solution consisting of 1.75 parts by weight of Ashland 240 petroleum pitch dissolved in 1.0 part by weight of furfural. This composition was prepared by mixing the two ingredients at room temperature for 8 hours, and activating the solution to render same thermosetting at 95° C, by adding thereto 5 weight percent of diethylsulfate.

The control of reference electrode (C) and the treated electrode (D) were rebaked in production facilities following a standard rebake schedule. The processing conditions up to that point are listed in Table III hereinbelow. It is seen that the coking value of the impregnant pitch is 2.8% higher in the treated electrode D as compared to the control electrode C.

TABLE III

Processing Conditions of Case-Hardened (Coated) (24" dia. × 72") Electrode and Control

| Electrode Designation | Coating* Pitch-Furfural Ratio (P/F) | Electrode Weight (lbs.) | | | Pitch Pickup (%) | Coking Value of Impregnant (%) CV |
|---|---|---|---|---|---|---|
| | | Debarked | Impregnated | Rebaked | | |
| C (Control) | None | 2253 | 2466 | 2314 | 9.45 | 28.6 |
| D (Treated) | (1.75:1) 5 wt. %DES | 2252 | 2462 | 2318 | 9.33 | 31.4 |

Figure 4:
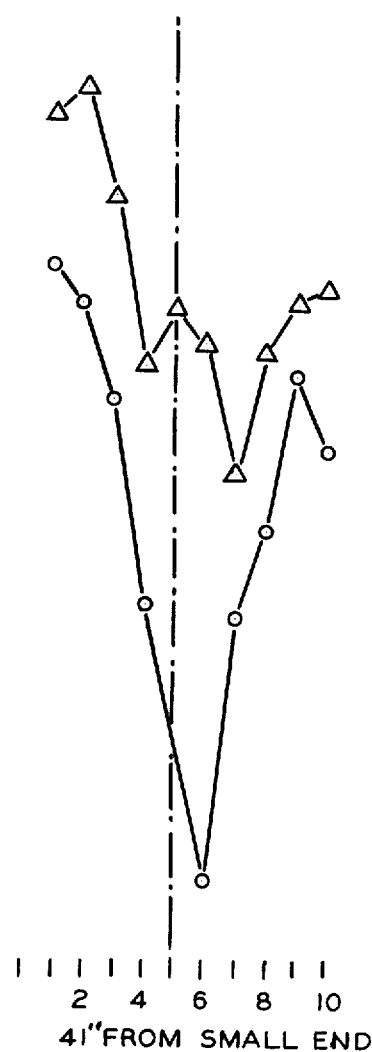
Figure 5:
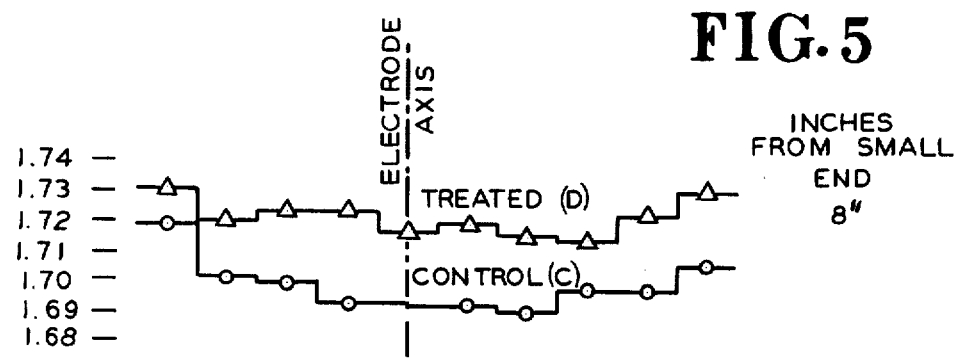
FIGS. 5 through 8 are graphs depicting bulk densities along the diameters and lengths of control electrodes, and of electrodes treated by the method of the present invention.
Figure 6:
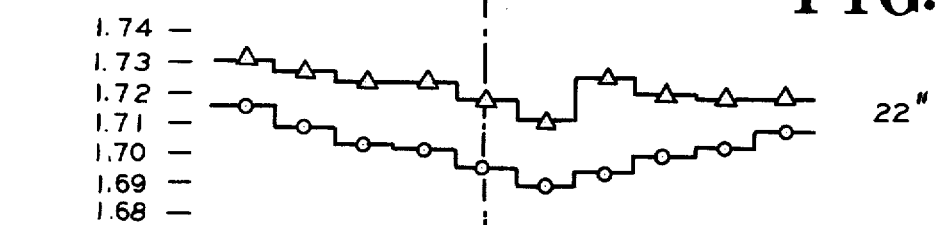
Figure 7:
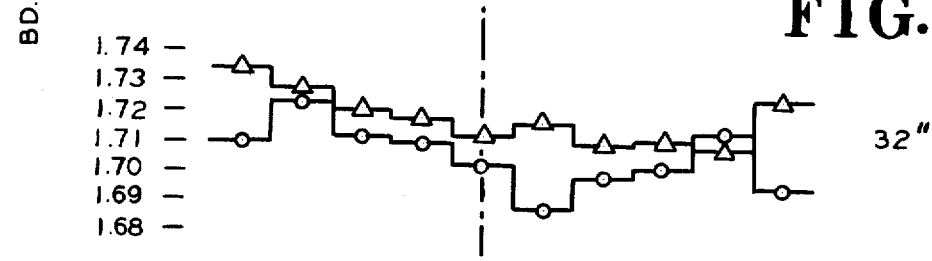
Figure 8:
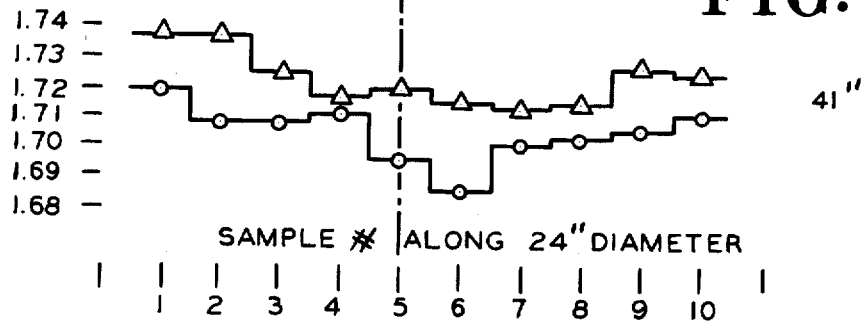

*P - Petroleum Pitch Ashland 240  
F - Furfural  
DES - Diethylsulfate Liquid Curing Agent The two 72 inch long electrodes C and D were then graphitized in a production graphitizer, and subsequently measured for physical properties. The electrode properties are set forth herein in tabular as well as in graphical form. Thus, FIGS. 1 through 4 depict flexural strength measurements along the diameters and lengths of the treated and reference electrodes. Similarly FIGS. 5 through 8 depict measurements of the apparent densities along the diameters and lengths of the treated and control electrodes. A summary of the strength and density properties is set forth in Table IV hereinbelow. In each instance in this Table, the maximum, minimum, and resultant average values for bulk density (B.D.) and for flexural strength(s) are tabularized for the ten measuring samples ($n = 10$) evaluated for each electrode at the specified distance from the small end of the electrode.

TABLE IV

Strength and Density Properties of Control Vs. Treated Electrode

| Electrode (24" × 72") | Distance From Small End of Electrode | | B.D. (n = 10) (gm/cc) | S(n = 10) (psi) |
|---|---|---|---|---|
| Control | 8" | Max. | 1.718 | 1797 |
| | | Min. | 1.680 | 968 |
| | | Avg. | 1.699 | 1436 |
| Treated | 8" | Max. | 1.730 | 1956 |
| | | Min. | 1.712 | 1485 |
| | | Avg. | 1.720 | 1789 |
| Control | 22" | Max. | 1.715 | 1792 |
| | | Min. | 1.690 | 1034 |
| | | Avg. | 1.701 | 1510 |
| Treated | 22" | Max. | 1.730 | 1977 |
| | | Min. | 1.710 | 1670 |
| | | Avg. | 1.721 | 1804 |
| Control | 32" | Max. | 1.722 | 1897 |
| | | Min. | 1.686 | 1331 |
| | | Avg. | 1.704 | 1565 |
| Treated | 32" | Max. | 1.733 | 2099 |
| | | Min. | 1.707 | 1146 |
| | | Avg. | 1.717 | 1781 |
| Control | 41" | Max. | 1.719 | 1855 |
| | | Min. | 1.686 | 1262 |
| | | Avg. | 1.705 | 1560 |
| Treated | 41" | Max. | 1.737 | 2151 |
| | | Min. | 1.713 | 1686 |
| | | Avg. | 1.723 | 1822 |

Referring to FIGS. 1 through 8 and Table IV, it will thus be seen that the strength and density properties of the treated electrode D exceed the corresponding properties of the control electrode C. It will also be noted that all properties show some deterioration in going from the surface to the axis of the electrodes — the phenomenon appearing to be slightly more pronounced at mid-length than at the ends of the electrodes. It will at the same time, however, be evident that such phenomenon is less pronounced in the treated electrode than in the reference stock. Thus it is seen that the present invention not only yields greater strength and density in the treated body; but moreover it will be seen that the said properties in the treated electrode are much more uniform along the diameter of such treated body, than are the corresponding properties in the control electrode.

The coating (treating) compositions thus far described herein have comprised petroleum pitch-furan systems, together with curing agents for the said system. High melting point coal tar pitches can be effectively substituted for the petroleum pitch. For example, a coal tar pitch having a melting point of about 180° C may be so used. Further, solid resins, such as solid epoxy and phenolic resins may be combined with a furan and catalytic curing agent to comprise the treating solution utilized pursuant to the present invention.

In general the solid epoxy or phenolic resins are dissolved in the furan solvents prior to their activation with curing agents. Furfuryl alcohol, furfural, or combination of the two furans can be used as solvents for the powedered resins. Various conventional acid curing agents can be employed, typically at additional levels of about 5 to 10 weight %, such as diethylsulfate, P-toluene sulfonic acid, triethanolamine, benzene sulfonic acid, and crotonic acid.

EXAMPLE III

A thermosetting coating system suitable for use in the present invention was formulated as a 1:1 (by weight) solution of a solid epoxy resin in a 1:1 (by weight) solution of furfuryl alcohol and furfural. The epoxy resin utilized was the EPON 1031 product of Shell Chemical Co.; this is a bisphenol-epichlorohydrin type solid epoxy resin. The treating solution has a long shelf-life and was rendered thermosetting at 100° C to 135° C by adding 10 weight percent of diethylsulfate as a curing agent.

EXAMPLE IV

A further thermosetting system suitable for use as the coating composition of the present invention was prepared as a 1:1 by weight solution of solid phenolic resin in furfural. The phenolic resin so utilized was the GE-9 product of Velsicol Chemical Co., which product is a solid linear hydrocarbon polymer. The phenolic-furfural solution was rendered thermosetting at about 100° C to 135° C by the addition of 10 weight percent of toluene sulfonic acid.

Each of the treating solutions of Examples III and IV yield suitable coatings for pitch-impregnated bodies of the type considered herein, and are especially useful at higher solid to liquid ratios. In general, the ratio between solid resin and the solvent should be in the range of 1:2 to 2:1, with a 1:1 ratio being preferred. It may be noted here that there are fundamental differences in the thermal decomposition reactions which occur during rebake for the pitch impregnated into the pores of the carbonaceous body, and the decomposition reactions for the pitch-furan, epoxy resin-furan or phenolic resin-furan coatings. The pitch impregnant, as already discussed, is thermoplastic and stays partially liquid during pyrolysis up to the coking temperature of approximately 450° C. In contrast the catalyzed pitch-furan coating or the solid resin-furan coatings are liquid at room temperature (i.e. when applied), become partially cured by air curing, and are fully cured during initial rebake as temperatures reach between 90° C and 135° C. On heating between 300° C and 450° C the thermoset coatings undergo degassification and carbonization in the solid state.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly the invention is to be broadly construed, and limited only by the scope and spirit of the claims now appended hereto.

I claim:

1. A method for increasing density and strength in a baked carbonaceous body, comprising: impregnating said body with a tarry hydrocarbon composition; coating said impregnated body with a thermosetting polymerizable composition, and at least partially curing said latter composition to provide an encasing shell of polymeric material about said body that is mechanically stable during a subsequent baking step to temperatures above the softening and free flowing temperatures for said impregnating composition; and thereafter baking said shell-encased body to effect carbonization of the impregnated and the encasing compositions.

2. A method in accordance with claim 1, wherein said baking is followed by a treatment effecting graphitization of said body.

3. A method in accordance with claim 1, wherein said coating composition comprises pitch, a resinifiable furan, and a catalytic curing agent.

4. A method in accordance with claim 3, wherein said coating composition comprises petroleum pitch, furfural, and said curing agent.

5. A method in accordance with claim 1, wherein said coating composition comprises a solid resin dissolved in a furan plasticizer, together with a catalytic curing agent.

6. A method in accordance with claim 5, wherein said solid resin is selected from one or more members of the group consisting of the epoxy and phenolic resins.

7. A method in accordance with claim 5, wherein said coating composition comprises a solution of an epoxy resin in furfuryl alcohol and furfural, together with said curing agent.

8. A method in accordance with claim 5, wherein said coating composition comprises a solution of phenolic resin in furfural together with said curing agent.

9. A method in accordance with claim 4, wherein said coating composition comprises from about 0.5 to about 3 parts by weight of said pitch to about 1.0 parts by weight furfural, together with about 5% by weight of pitch and furfural, of said catalytic curing agent.

10. A method in accordance with claim 6, wherein said coating composition comprises from about 0.5 to about 2 parts by weight of said solid resin for each part by weight of said furan plasticizer.

* * * * *